(12) United States Patent
Wagner

(10) Patent No.: US 7,077,616 B2
(45) Date of Patent: Jul. 18, 2006

(54) LATCH ASSEMBLY FOR A RAMP OF A VEHICLE TRAILER

(75) Inventor: Larry K. Wagner, Sussex, WI (US)

(73) Assignee: Triton Corporation, Hartford, WI (US)

( * ) Notice: Subject to any disclaimer, the term of this patent is extended or adjusted under 35 U.S.C. 154(b) by 247 days.

(21) Appl. No.: 10/667,554

(22) Filed: Sep. 22, 2003

(65) Prior Publication Data

US 2005/0063810 A1 Mar. 24, 2005

(51) Int. Cl.
*B60P 1/43* (2006.01)
(52) U.S. Cl. ..................................... 414/537
(58) Field of Classification Search ............... 414/537, 414/538; 296/37.6, 61; 248/316.2, 503; 410/80; 14/71.1
See application file for complete search history.

(56) References Cited

U.S. PATENT DOCUMENTS

| | | | | |
|---|---|---|---|---|
| 3,877,624 A | * | 4/1975 | Carson | 224/323 |
| 4,294,571 A | * | 10/1981 | Tordella | 414/537 |
| 4,380,415 A | * | 4/1983 | Higginson et al. | 414/537 |
| 4,850,788 A | * | 7/1989 | Dickson | 414/537 |
| 5,306,113 A | * | 4/1994 | Mann | 414/537 |
| 5,462,249 A | * | 10/1995 | Calzone | 248/316.7 |
| 6,238,168 B1 | * | 5/2001 | Cohn et al. | 414/537 |
| 6,514,030 B1 | * | 2/2003 | Young et al. | 414/537 |
| 6,644,908 B1 | * | 11/2003 | Weseman | 414/537 |
| 6,802,095 B1 | * | 10/2004 | Whitmarsh et al. | 14/71.3 |
| 2001/0033787 A1 | * | 10/2001 | Eekhoff | 414/537 |

* cited by examiner

*Primary Examiner*—James W. Keenan
(74) *Attorney, Agent, or Firm*—Boyle Fredrickson Newholm Stein & Gratz S.C.

(57) ABSTRACT

A latch assembly is provided for selectively maintaining a ramp of a trailer in a storage position. The latch assembly includes a mounting tube mounted to the underside of the trailer and a clamp tube operatively connected to the mounting tube by a plurality of link arms. The clamp tube is vertically movable between an interfering position wherein the clamp tube is vertically spaced from the mounting tube and interfering portions of the link arm intersect the plane in which the ramp of the trailer lies and a non-interfering position where the clamp tube is adjacent the mounting tube.

16 Claims, 4 Drawing Sheets

LATCH ASSEMBLY FOR A RAMP OF A VEHICLE TRAILER

FIELD OF THE INVENTION

This invention relates generally to trailers, and in particular, to a latch assembly for selectively maintaining a ramp for a trailer in a storage position during the transport of the trailer by a vehicle.

BACKGROUND AND SUMMARY OF THE INVENTION

As is known, trailers are used in a wide variety of applications including the transport of vehicles such as automobiles, snowmobiles, all terrain vehicles and boats. In order to position a vehicle on or remove a vehicle from the bed of a trailer, a ramp is often used. In a trailer that is specifically designed for transporting vehicles, the ramp may be provided with the trailer. Typically, the ramp is stored underneath the bed of the trailer when not in use. When needed, a user slides the ramp horizontally from its storage position underneath the bed of the trailer until such point as the leading edge of the ramp is generally co-planar with the trailing edge of the trailer. At such point, the trailing edge of the ramp is deposited on the supporting surface behind the trailer. As described, the ramp provides a structure for allowing a user to position a vehicle on or remove a vehicle from the bed of a trailer.

It can be appreciated that it is necessary to maintain the ramp in its storage position underneath the bed of the trailer during transport of the trailer by a tow vehicle. If the ramp inadvertently slides from its storage position out of the trailing end of the trailer, the ramp can constitute a hazard to other vehicles on the road or to the trailer itself. Consequently, a latch assembly is often used to retain the ramp in its storage position underneath the bed of the trailer. However, these prior latch assemblies are often complicated devices that are difficult to operate and expensive to manufacture. Further, these prior latch assemblies often allow for limited vertical movement of the ramp when it is in its storage position underneath the bed of the trailer. Hence, during transport of the trailer by a tow vehicle, the ramp has a tendency to move vertically within its storage position thereby generating a significant amount of undesirable noise. As such, it is highly desirable to provide a simpler, less expensive alternative to latch assemblies now available that prevents vertical movement of the ramp of the trailer during transport.

Therefore, it is a primary object and feature of the present invention to provide a latch assembly for maintaining a ramp of a trailer in its storage position.

It is a further object and feature of the present invention to provide a latch assembly for maintaining a ramp of a trailer in its storage position that is simple to utilize and inexpensive to manufacture.

It is a still further object and feature of the present invention to provide a latch assembly for maintaining a ramp of a trailer in its storage position that allows the ramp be simply and easily removed from its storage position when desired.

In accordance with the present invention, a latch assembly is provided for a ramp of a trailer. The ramp is movable between a storage position wherein the ramp is stored below the trailer and an extended position wherein the ramp extends from the trailer. The latch assembly includes a mounting tube that extends along a longitudinal axis and is mountable to the underside of the trailer. A link arm pivotably connects a clamp tube to the mounting tube. The clamp tube is vertically movable between an interfering position wherein the clamp tube is vertically spaced from the mounting tube and a non-interfering position wherein the clamp tube is adjacent the mounting tube.

The link arm includes an interfering portion and is movable between a latching position wherein the interfering portion of the link arm extends through a plane in which the ramp is stored below the trailer with the clamp tube in the interfering position and a non-latching position. A locking device is connectable to a link arm for maintaining the link arm in the latching position. The interfering portion of the link arm includes a beveled leading edge.

A handle may be interconnected to the terminal end of the link arm to facilitate movement of the clamp tube between the interfering and non-interfering positions. In addition, a connection arm pivotably connects the clamp tube to the mounting tube. The connection arm is axially spaced from the link arm.

In accordance with a further aspect of the present invention, a latch assembly is provided for a ramp of a trailer. The ramp is movable between a storage position wherein the ramp is stored below the trailer and an extended position wherein the ramp extends from the trailing edge of the trailer. The latch assembly includes a movable handle extending along an axis and having leading and trailing ends. A leading link arm pivotably connects the leading end of the movable handle to the trailer, and a trailing link arm pivotably connects the trailing end of the movable handle to the trailer. The trailing link arm has an interfering portion extending from the movable handle. The movable handle is movable between an interfering position wherein the interfering portion of the trailing link arm intersects the plane in which the ramp is stored below the trailer and a non-interfering position.

The latch device may also include a mounting element rigidly connected to the trailer and having leading and trailing ends. The leading link arm is pivotably connected to the leading end of the mounting element and the trailing link arm is also pivotably connected to the mounting element. A locking device is connectable to the trailing link arm for maintaining the movable handle in the interfering position. The interfering portion of the trailing link arm includes a beveled leading edge extending through the plane. A grasping member projects laterally from a terminal end of the trailing link arm to facilitate movement of the movable handle between the interfering and non-interfering positions. It is contemplated for the movable handle to take the form of an elongated tube having a generally rectangular cross section. The elongated tube has first and second sides and upper and lower faces.

The leading and trailing link arms are pivotably connected to the first side of the elongated tube. In addition, it is contemplated that the latch assembly includes a second leading link arm for pivotably connecting the second side of the leading end of the elongated tube to the trailer and a second trailing link arm for pivotably connecting the second side of the trailing end of the elongated tube to the trailer. The second trailing link arm has an interfering portion extending from the elongated tube. The interfering portion of the second trailing link arm intersects the plane in which the ramp is stored below the trailer with the movable handle in the interfering position.

In accordance with a still further aspect of the present invention, a latch assembly is provided for a ramp of a trailer. The ramp is movable between a storage position wherein the ramp lies in a plane below the trailer and an extended position where the ramp extends from the trailer. The latch assembly includes a mounting tube extending along a longitudinal axis and having first and second sides, leading and trailing ends, and upper and lower faces. The upper face of the mounting tube is connectable to the underside of the trailer. A clamp tube extends along a longitudinal axis and has first and second sides, and leading and trailing ends. A first leading link arm is positioned adjacent the leading end of the clamp tube for pivotably connecting the first side of the clamp tube to the first side of the mounting tube. A second leading link arm is positioned adjacent the leading end of the clamp tube for pivotably connecting the second side of the clamp tube to the second side of the mounting tube. A first trailing link arm is positioned adjacent to the trailing end of the clamp tube for pivotably connecting the first side of the clamp tube to the first side of the mounting tube. The first trailing link arm has an interfering portion extending from the clamp tube. A second trailing link arm is position adjacent the trailing end of the clamp tube for pivotably connecting the second side of the clamp tube to the second side of the mounting tube. The second trailing link arm has an interfering portion extending from the clamp tube. The clamp tube is vertically movable between an interfering position wherein the clamp tube is vertically spaced from the mounting tube and the interfering portions of the first and second trailing link arms intersect the plane and a non-interfering position wherein the clamp tube is adjacent the mounting tube.

The latch assembly may also include a grasping member. The grasping member including a first grasping portion extending laterally from the first trailing link arm, a second grasping portion extending laterally from the second trailing link arm, and a central grasping portion extending between the first and second trailing link arms. At least one of the trailing link arms includes an aperture therethrough. A locking member having a bolt receivable in the aperture of the at least one of the trailing link arms maintains the clamp tube in the interfering position. The interfering portions of the first and second link arms include beveled leading edges that extend through the plane.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE INVENTION

Figure 1:
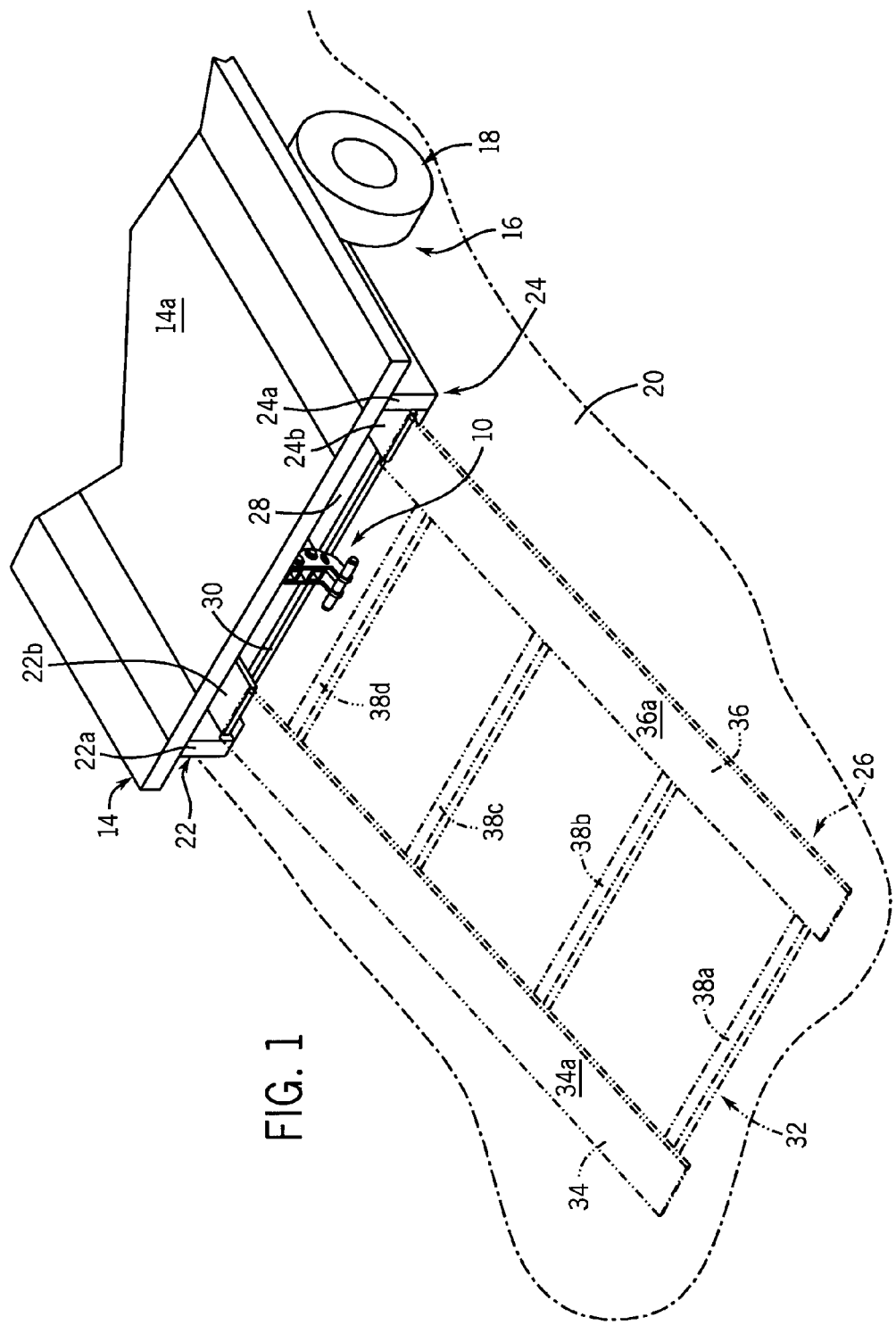
FIG. 1 is an isometric view of a portion of a trailer incorporating the latch assembly of the present invention.
Figure 2:
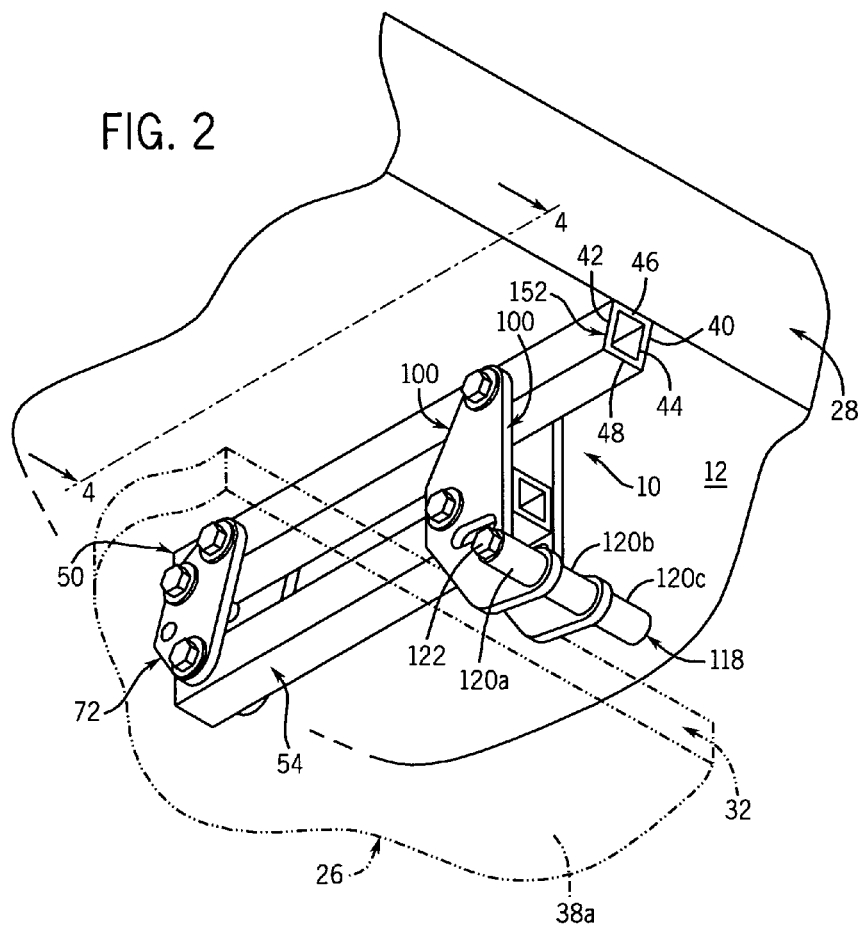
FIG. 2 is an enlarged, isometric view of the latch assembly of the present invention mounted to the underside of a trailer.
Figure 3:
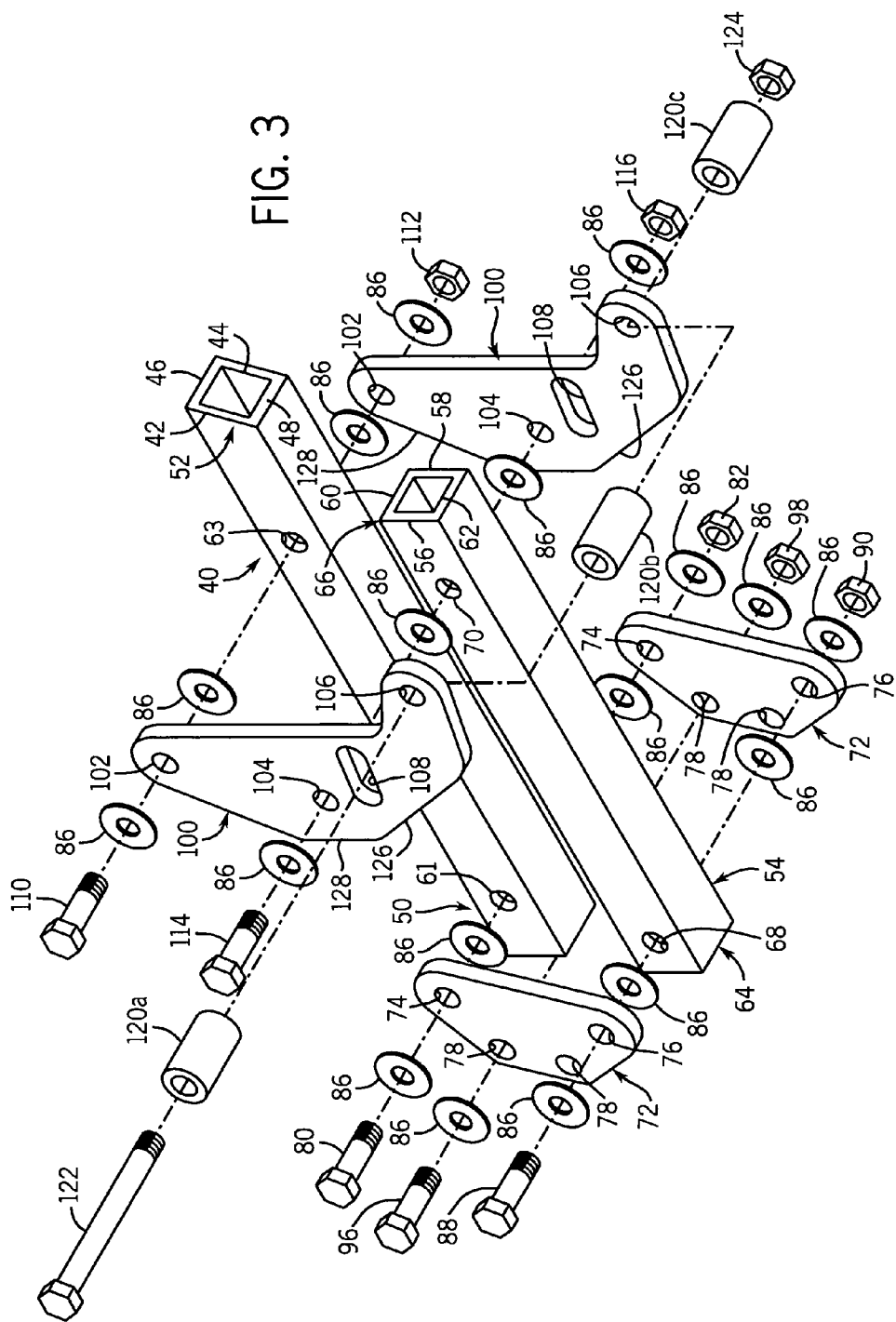
FIG. 3 is an exploded, isometric view of the latch assembly of the present invention.

Referring to FIGS. 1 and 2, a latch assembly in accordance with the present invention is generally designated by the reference numeral 10. It is intended that latch assembly 10 be mounted to the underside 12 of bed 14 of a trailer 16. By way of example, latching mechanism may be welded to a rear cross frame member of trailer 16, FIGS. 4 and 5. However, latch assembly 10 may be mounted at other locations on the underside 12 of trailer 16 without deviating from the scope of the present invention.

As is conventional, trailer 16 includes a plurality of wheels 18 for supporting trailer bed 14 above supporting surface 20, such as the ground, a road or the like. Trailer 16 further includes first and second ramp supports 22 and 24, respectively, depending from underside 12 of bed 14 so as to define a ramp storage cavity therebetween. Ramp supports 22 and 24 are defined by first and second vertical side walls 22a and 24a, respectively, that limit lateral movement of ramp 26 when ramp 26 is received within the ramp storage cavity in trailer 16 and first and second horizontal legs 22b and 24b, respectively, that provide vertical support for ramp 26 when positioned within the ramp storage cavity.

It is intended that ramp 26 be inserted into and removed from the ramp storage cavity in trailer 26 through an opening in the trailing end 28 of trailer 16 between ramp supports 22 and 24. Ramp 26 includes leading end 30 and trailing end 32 and is depicted as having first and second generally flat vehicle support panels 34 and 36, respectively, extending along corresponding axes. Vehicle support panels 34 and 36 include corresponding vehicle support surfaces 34a and 36a, respectively, for supporting a vehicle as the vehicle is positioned on or removed from upper surface 14a of bed 14 of trailer 16. As best seen in FIG. 1, first and second vehicle support panels 34 and 36 are interconnected by a plurality of axially spaced cross beams 38a-38d. Cross beam 38a defines trailing edge 32 of ramp 26. Once again, it can be understood that ramp 26 may take on different configurations without deviating from the scope of the present invention.

Referring to FIGS. 2–5, latch assembly 10 includes mounting tube 40 extending along a longitudinal axis. Mounting tube 40 is defined by first and second sidewalls 42 and 44, respectively, and upper and lower walls 46 and 48, respectively, such that mounting tube 40 has a generally rectangular cross-section. Upper wall 46 is connected to underside 12 of trailer 16 in any conventional manner such as by welding or the like. By way of example, upper wall 46 of mounting tube 40 may be welded to the lower surface 49 of cross frame member 51. Cross frame member 51 of trailer 16 is generally transverse to mounting tube 40 and includes upper surface 53 that engages lower surface 14b of trailer bed 14. Mounting tube 40 includes leading end 50 and an opposite trailing end 52 that is positioned adjacent trailing end 28 of trailer 16.

Latch assembly 10 further includes clamp tube 54 defined by first and second sidewalls 56 and 58, respectively, and upper and lower walls 60 and 62, respectively, such that clamp tube 54 has a generally rectangular cross section. Clamp tube 54 extends along a longitudinal axis and includes leading end 64 and opposite trailing end 66. Axially aligned apertures 68 are provided in sidewalls 56 and 58 of clamp tube 54 adjacent leading end 64 thereof. In addition, axially aligned apertures 70 are provided in sidewalls 56 and 58 of clamp tube 54 adjacent the trailing end 66 thereof.

Leading end 50 of mounting tube 40 and leading end 64 of clamp tube 54 are pivotably connected to each other by a pair of leading links 72. Leading links 72 include upper apertures 74 and lower apertures 76. In addition, leading links 72 include intermediate apertures 78. One of the leading links 72 is positioned adjacent first sidewall 42 of mounting tube 40 such that its upper aperture 74 is axially aligned with aperture 61 in first sidewall 42 of mounting tube 40 and adjacent first sidewall 56 of clamp tube 54 such that its lower aperture 76 is axially aligned with aperture 68 in first sidewall 56 of clamp tube 54. In addition, the other of the leading links 72 positioned adjacent second side 44 of mounting tube 40 such that its upper aperture 74 is axially aligned with aperture 61 in second sidewall 44 of mounting tube 40 and adjacent clamp tube 54 such that its lower aperture 76 is axially aligned with aperture 68 in second sidewall 58 of clamp tube 54. Upper bolt 80 includes a shaft extending through upper apertures 74 of leading links 72 and through apertures 61 in sidewalls 42 and 44 of mounting tube 40. Nut 82 is threaded on terminal end of upper bolt 80 so as to interconnect leading links 72 to mounting tube 40. It is contemplated to provide washers 86 on the shaft of upper bolt 80 to allow leading links 72 to pivot on the shaft of upper bolt 80 with respect to mounting tube 40. Lower bolt 88 extends through lower apertures 76 in leading links 72 and through apertures 68 in sidewalls 56 and 58 of clamp tube 54. Nut 90 is threaded on to the terminal end of lower bolt 88 so as to interconnect leading links 72 to clamp tube 54. Washers 86 may be positioned on the shaft of lower bolt 88 to facilitate movement of clamp tube 54 with respect to leading links 72. Intermediate bolt 96 extends through intermediate apertures 78 in leading links 72. Nut 98 is threaded on the terminal end of intermediate bolt 96 to interconnect leading links 72. Washers 86 may be positioned on the shaft of intermediate bolt 96.

Latch assembly 10 further includes trailing links 100 for pivotally connecting trailing end 52 of mounting tube 40 and trailing end 66 of clamp tube 54. Trailing links 100 include upper apertures 102, intermediate apertures 104 and lower apertures 106. In addition, trailing links 100 include oblong locking apertures 108, for reasons hereinafter described. One of the trailing links 100 is positioned adjacent first sidewall 42 of mounting tube 40 such that its upper aperture 102 is axially aligned with aperture 63 through first sidewall 42 of mounting tube 40 and adjacent first sidewall 56 of clamp tube 54 such that its intermediate aperture 104 is axially aligned with aperture 70 in first sidewall 56 of clamp tube 54. The other of the trailing links 100 is positioned adjacent the second sidewall 44 of mounting tube 40 such that upper aperture 102 is axially aligned with aperture 63 in second sidewall 44 of mounting tube 40 and adjacent second sidewall 58 of clamp tube 54 such that intermediate aperture 104 is axially aligned with aperture 70 in second sidewall 58 of clamp tube 54. Upper bolt 110 extends through upper apertures 102 in trailing links 100 and through apertures 63 in sidewalls 42 and 44 of mounting tube 40. Nut 112 is threaded on the terminal end of upper bolt 110 so as to interconnect trailing links 100 to mounting tube 40. Washers 86 may be provided on upper bolt 110 to facilitate pivoting of trailing links 100 on the shaft of bolt 110. Intermediate bolt 114 extends through intermediate apertures 104 in trailing links 100 and through apertures 70 in sidewalls 56 and 58 of clamp tube 54. Nut 116 is threaded on the terminal end of bolt 114 so as to interconnect trailing links 100 to clamp tube 54. Washers 86 may be positioned on the shaft of bolt 114. Washers 86 facilitate the pivoting of clamp tube 54 and trailing links 100 on the shaft of intermediate bolt 114.

Latch 10 further includes handle 118 having grasping portions 120a–c supported on the shaft of bolt 122. Bolt 122 extends sequentially through grasping portion 120a, lower aperture 106 in trailing link 100 adjacent first side 56 of clamp tube 54, grasping portion 120b, lower aperture 106 in trailing link 100 adjacent second sidewall 58 of clamp tube 54, and grasping portion 120c. Nut 124 is threaded onto the terminal end of the shaft of bolt 122 so as to secure grasping portions 120a–c of handle 118 to trailing links 100.

Figure 4:
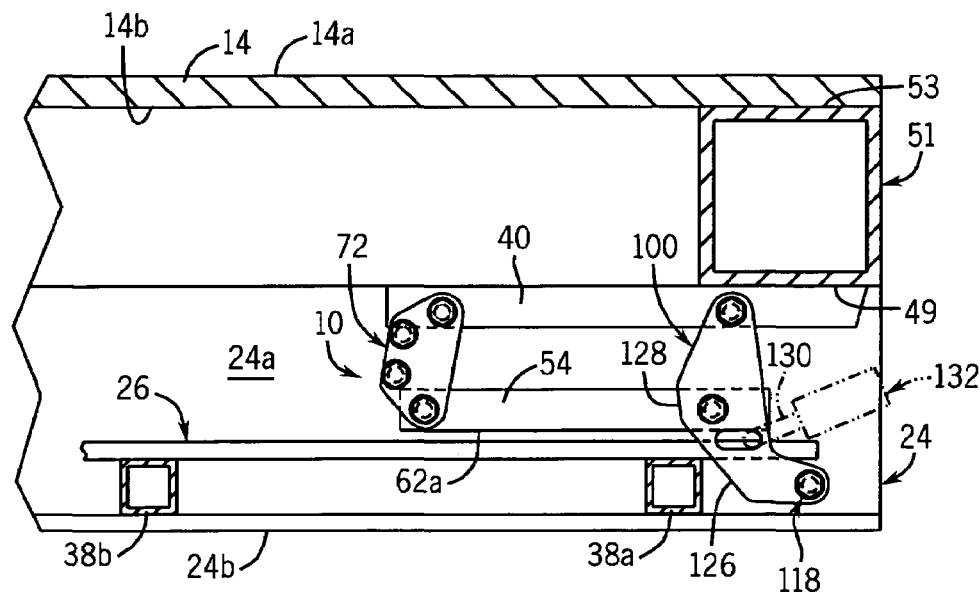
FIG. 4 is a cross-sectional view of the trailer incorporating the latch assembly of the present invention taken along line 4—4 of FIG. 2.
Figure 5:
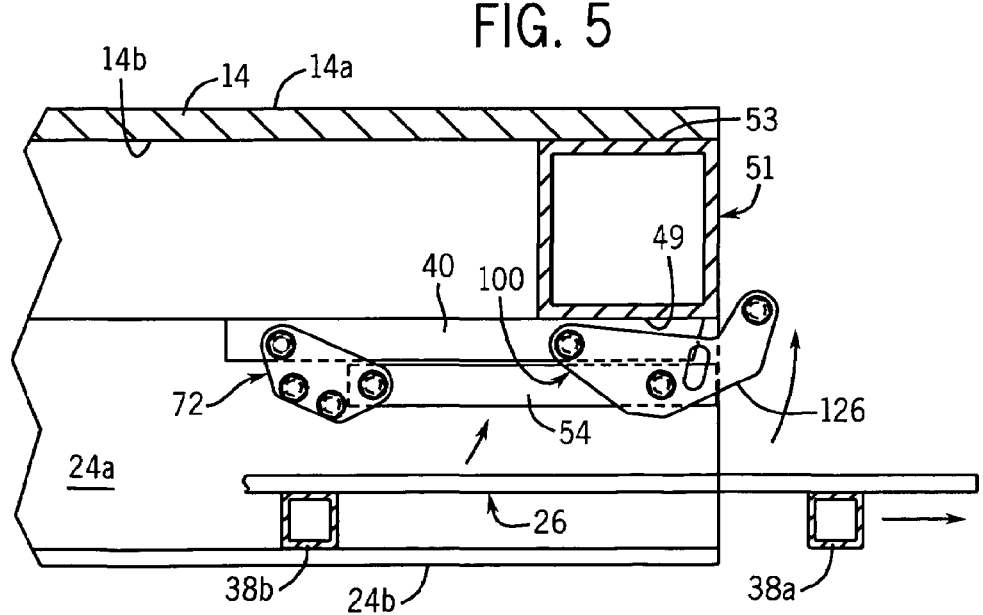
FIG. 5 is a cross-sectional view, similar to FIG. 4, showing the latch assembly of the present invention in a non-latching position.

In its assembled configuration, clamp tube 54 is pivotable between a lowered position, FIG. 4, wherein clamp tube 54 is vertically spaced from mounting tube 40, and a raised or non-latching position, FIG. 5, wherein upper wall 60 of clamp tube 54 is adjacent lower wall 48 of mounting tube 40. Handle 118 allows a user to grasp latch assembly 10 and pivot clamp tube 54 between the lowered position, FIG. 4, and the non-latching position, FIG. 5.

In operation, ramp 26 is positioned within the ramp storage cavity between ramp supports 22 and 24. As best seen in FIG. 4, with ramp 26 in its storage position, latch assembly 10 may be positioned in its lowered position such that beveled portions 126 of the leading edges 128 of trailing links 100 extend through the plane of ramp 26. Bolt 130 of lock 132 may extend through one or both of locking apertures 108 in trailing links 100. With bolt 130 of lock 132 extending through locking apertures 108 in trailing links 100, clamp tube 54 is fixed in the lowered position. With clamp tube 54 fixed in its lowered position, lower surface 62a of lower wall 62 of clamp tube 54 is adjacent the upper surface of ramp 26 thereby limiting vertical movement of ramp 26 and preventing the generation of undesirable noise by ramp 26 during the transport of trailer 16.

If a user desires to move ramp 26 from the ramp storage cavity under bed 14, of trailer 16, bolt 130 of lock 132 must be removed from locking apertures 108 of trailing links 100 so as to allow clamp tube 54 to pivot to the non-latching position, FIG. 5. Latch assembly 10 may be moved to the latching position by the user grasping handle 118 and pivoting clamp tube 54. Thereafter, ramp 54 may be slid axially from ramp storage cavity below bed 14. Alternatively, trailing edge 32 of ramp 26 may engage the beveled portions of trailing links 100 so as to urge the beveled portions 126 of leading edges 128 of trailing links 100 out of interfering relationship with the leading end 32 of ramp 26 thereby allowing ramp 26 to be slid axially from the ramp storage cavity under bed 14 of trailer 16.

Various modes of carrying out the invention are contemplated as being within the scope of the following claims particularly pointing out and distinctly claiming the subject matter which is regarded as the invention.

I claim:

1. A latch assembly for a ramp of a trailer, the ramp moveable between a storage position wherein the ramp is stored below the trailer and an extended position wherein the ramp extends from the trailer, comprising:

a mounting tube extending along a longitudinal axis and mountable to an underside of the trailer;

a clamp tube; and a link arm for pivotably connecting the clamp tube to the mounting tube, the clamp tube vertically movable between a first position wherein the clamp tube extends along a first axis generally parallel to the longitudinal axis and is vertically spaced from the mounting tube and a second position wherein the clamp tube extends along a second axis generally parallel to the longitudinal axis and is adjacent the mounting tube.

2. The latch assembly of claim 1 wherein the link arm includes an interfering portion, the link arm movable between a latching position wherein the interfering portion of the link arm extends through a plane in which the ramp is stored below the trailer with the clamp tube in the first position and a non-latching position.

3. The latch assembly of claim 2 further comprising a locking device connectable to the link arm for maintaining the link arm in the latching position.

4. The latch assembly of claim 2 wherein the interfering portion of the link arm includes a beveled leading edge.

5. The latch assembly of claim 1 further comprising a handle interconnected to a terminal end of the link arm to facilitate movement of the clamp tube between the first and second positions.

6. The latch assembly of claim 1 further comprising a connection arm pivotably connecting the clamp tube to the mounting tube, the connection arm being axial spaced from the link arm.

7. A latch assembly for a ramp of a trailer, the ramp moveable between a storage position wherein the ramp is stored below the trailer and an extended position wherein the ramp extends from a trailing edge of the trailer, comprising:
   a moveable handle extending along an axis and having leading and trailing ends, a first side and an opposite second side;
   a leading link arm intersecting a plane generally coplanar with the first side of the handle and pivotably connecting the leading end of the movable handle to the trailer; and
   a trailing link arm intersecting the plane generally coplaner with the first side of the handle and pivotably connecting the trailing end of the movable handle to the trailer, the trailing link arm having an interfering portion extending from the movable handle;
   wherein the interfering portion of the trailing link arm is moveable between an interfering position wherein the interfering portion of the trailing link arm intersects a plane spaced from the second side of the handle in which the ramp is stored below the trailer and a non-interfering position.

8. The latch assembly of claim 7 further comprising a mounting element rigidly connectable to the trailer and having leading and trailing ends, the leading link arm being pivotably connected to the leading end of the mounting element and the trailing link arm pivotably connected to the mounting element.

9. The latch assembly of claim 7 further comprising a locking device connectable to the trailing link arm for maintaining the moveable handle in the interfering position.

10. The latch assembly of claim 7 wherein the interfering portion of the trailing link arm includes a beveled leading edge extending through the plane.

11. The latch assembly of claim 7 further comprising a grasping member projecting laterally from a terminal end of the trailing link arm to facilitate movement of the movable handle between the interfering and non-interfering positions.

12. A latch assembly for a ramp of a trailer, the ramp moveable between a storage position wherein the ramp lies in a plane below the trailer and an extended position wherein the ramp extends from the trailer, comprising:
   a mounting tube extending along a longitudinal axis and having first and second sides; leading and trailing ends; and upper and lower faces, the upper face being connectable to an underside of the trailer;
   a clamp tube extending along a longitudinal axis and having first and second sides and leading and trailing ends;
   a first leading link arm adjacent the leading end of the clamp tube for pivotably connecting the first side of the clamp tube to the first side of the mounting tube;
   a second leading link arm adjacent the leading end of the clamp tube for pivotably connecting the second side of the clamp tube to the second side of the mounting tube;
   a first trailing link arm adjacent the trailing end of the clamp tube for pivotably connecting the first side of the clamp tube to the first side of the mounting tube, the first trailing link arm having an interfering portion extending from the clamp tube; and
   a second trailing link arm adjacent the trailing end of the clamp tube for pivotably connecting the second side of the clamp tube to the second side of the mounting tube, the second trailing link arm having an interfering portion extending from the clamp tube;
   wherein the clamp tube is vertically movable between an interfering position wherein the clamp tube is vertically spaced from the mounting tube and the interfering portions of the first and second trailing link arms intersect the plane and a non-interfering position wherein the clamp tube is adjacent the mounting tube.

13. The latch assembly of claim 12 further comprising a grasping member, the grasping member including:
   a first grasping portion extending laterally from the first trailing link arm;
   a second grasping portion extending laterally from the second trailing link arm; and
   a central grasping portion extending between the first and second trailing link arms.

14. The latch assembly of claim 12 wherein at least one of the trailing link arms includes an aperture therethrough and wherein the latch assembly further comprises a locking member having bolt receivable in the aperture of the at least one of the trailing link arms for maintaining the clamp tube in the interfering position.

15. The latch assembly of claim 12 wherein the interfering portions of the first and second trailing link arms include beveled leading edges that extend through the plane.

16. A latch assembly for a ramp of a trailer, the ramp moveable between a storage position wherein the ramp is stored below the trailer and an extended position wherein the ramp extends from a trailing edge of the trailer, comprising:
   a moveable handle extending along an axis and having leading and trailing ends, a first side and an opposite second side wherein the moveable handle is an elongated tube having a generally rectangular cross-section, the elongated tube having first and second sides and upper and lower faces;
   a leading link arm for intersecting a plane generally co-planer with the first side of the handle and pivotably connecting the leading end of the movable handle to the trailer; and
   a trailing link arm for intersecting a plane generally co-planer with the first side of the handle pivotably connecting the trailing end of the movable handle to the trailer, the trailing link arm having an interfering portion extending from the movable handle;
   wherein:
   the interfering portion of the trailing link arm is moveable between an interfering position wherein the interfering portion of the trailing link arm intersects a plane spaced from the second side of the handle in which the ramp is stored below the trailer and a non-interfering position;

the leading and trailing link arms are pivotably connected to the first side of the elongated tube, the latch assembly further comprises:

a second leading link arm for pivotably connecting the second side of the leading end of the elongated tube to the trailer; and a second trailing link arm for pivotably connecting the second side of the trailing end of the elongated tube to the trailer, the second trailing link arm having an interfering portion extending from the elongated tube;

the interfering portion of the second trailing link arm intersects the plane in which the ramp is stored below the trailer with the moveable handle in the interfering position.

* * * * *